United States Patent

Chen et al.

[11] Patent Number: 5,990,870
[45] Date of Patent: Nov. 23, 1999

[54] FINGER REST STRUCTURE OF COMPUTER MOUSE

[76] Inventors: Mei-Yun Chen; Fu-Kuo Yeh, both of 3F, No. 2, Lane 42, Hou-Kang St., Shih-Lin Dist., Taipei, Taiwan

[21] Appl. No.: 08/925,720

[22] Filed: Sep. 9, 1997

[51] Int. Cl.[6] .................................................. G09G 5/08
[52] U.S. Cl. .......................... 345/163; 345/156; 345/161; 345/168
[58] Field of Search .................................. 345/156, 157, 345/163, 168, 161, 169

[56] References Cited

U.S. PATENT DOCUMENTS

| | | | |
|---|---|---|---|
| 4,862,165 | 8/1989 | Gart | 345/163 |
| 4,913,573 | 4/1990 | Retter | 345/163 |
| 4,917,516 | 4/1990 | Retter | 345/163 |
| 4,963,858 | 10/1990 | Chien | 345/157 |
| 5,063,376 | 11/1991 | Chang | 345/163 |
| 5,260,696 | 11/1993 | Maynard, Jr. | 345/163 |
| 5,490,647 | 2/1996 | Rice | 248/118.1 |
| 5,764,164 | 6/1998 | Cartabiano et al. | 341/22 |

Primary Examiner—Bipin H. Shalwala
Assistant Examiner—Ricardo Osorio
Attorney, Agent, or Firm—Bacon & Thomas, PLLC

[57] ABSTRACT

A finger rest structure of computer mouse, including a housing having a profile substantially suitable for manual operation of a user and a finger rest unit including at least one rest plate transversely projecting from a lateral side of the housing for a finger to rest thereon. Two rest plates are respectively disposed on left and right sides of the housing near front and rear ends. Alternatively, the rest plate is integrally connected along the rear side and a part of lateral side of the housing. Alternatively, the rest plates are pivotally and foldably connected with the housing or disposed at two ends of a rotary plate which is rotatably disposed under the housing, whereby the rest plate can be selectively extended or retracted. The rest plate serves to bear most of the weight of the hand and reduce the frictional force of the hand against the table face. Also, the rest plate enlarges the bottom area of the mouse, whereby the mouse can more closely attach to the table face during moving and the control of the mouse is facilitated.

7 Claims, 6 Drawing Sheets

FINGER REST STRUCTURE OF COMPUTER MOUSE

BACKGROUND OF THE INVENTION

The present invention relates to a finger rest structure of computer mouse, which is disposed on a lateral side of the mouse for the fingers to rest thereon. The finger rest structure also serves to bear most of the weight of the hand and reduce the frictional force of the hand against the table face. Also, the rest plate enlarges the bottom area of the mouse, whereby the mouse can more closely attach to the table face during moving and the control of the mouse is facilitated.

The computer-used input equipments such as keyboard and mouse have been developed to have versatile usages and meet the requirements of human profile. For example, the keyboard is designed to have key divisions normally reachable by a user's hand, whereby when inputting data, the hand of the user can easily touch the respective keys. Also, the mouse pad is disposed with a hand rest at rear end, whereby when operating the mouse, the wrist portion of the user will no longer positioned a bent state. However, with respect to the mouse, only change of key position and profile has been made, while the bearing of weight of the user's hand and avoiding of tired feeling of the hand are not considered. Moreover, when transversely moved, the mouse can be hardly closely attached to the table face and easily controlled.

SUMMARY OF THE INVENTION

It is therefore a primary object of the present invention to provide a finger rest structure of computer mouse, which is disposed on a lateral side of the mouse for the fingers to rest thereon.

According to the above object, the finger rest structure of the present invention includes a housing having a profile substantially suitable for manual operation of a user and a finger rest unit including at least one rest plate transversely projecting from a lateral side of the housing for a finger to rest thereon. Two rest plates are respectively disposed on left and right sides of the housing near front and rear ends. Alternatively, the rest plate is integrally connected along the rear side and a part of lateral side of the housing.

Alternatively, the rest plates are pivotally and foldably connected with the housing or disposed at two ends of a rotary plate which is rotatably disposed under the housing, whereby the rest plate can be selectively extended or retracted. The rest plate serves to bear most of the weight of the hand and reduce the frictional force of the hand against the table face. Also, the rest plate enlarges the bottom area of the mouse, whereby the mouse can more closely attach to the table face during moving and the control of the mouse is facilitated.

The resent invention can be best understood through the following description and accompanying drawings, wherein:

DETAILED DESCRIPTION OF THE PREFERRED EMBODIMENTS

Figure 1:
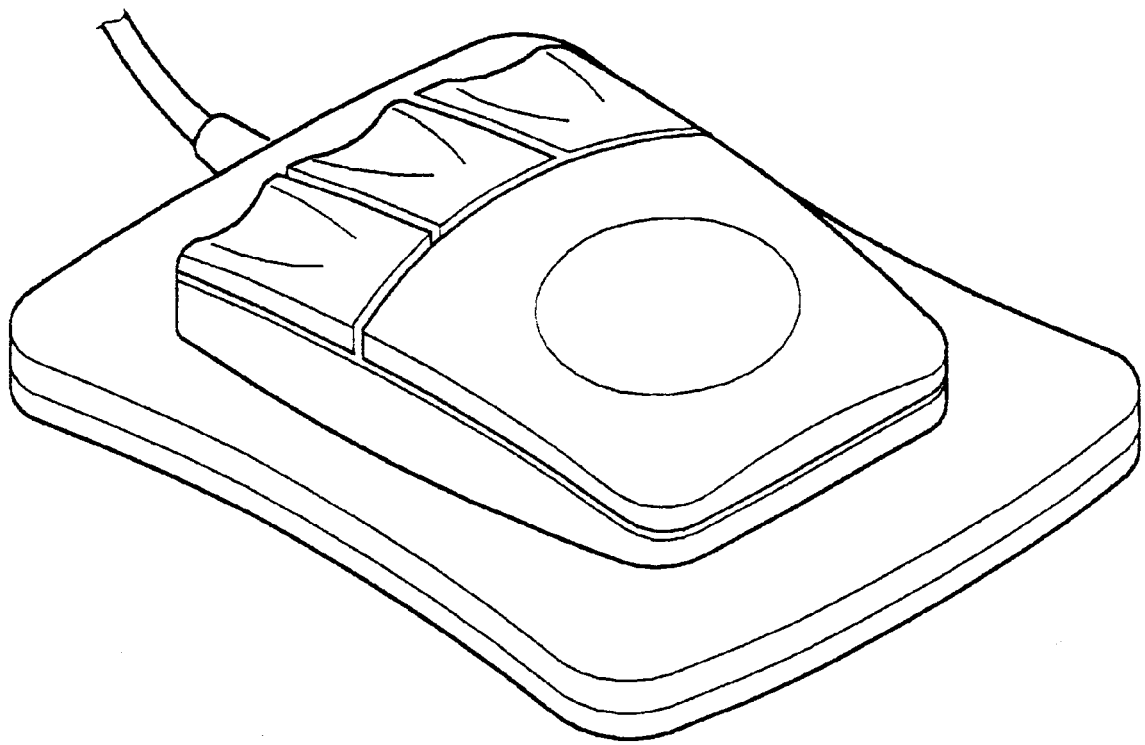
FIG. 1 is a perspective view of a conventional mouse.
Figure 2:
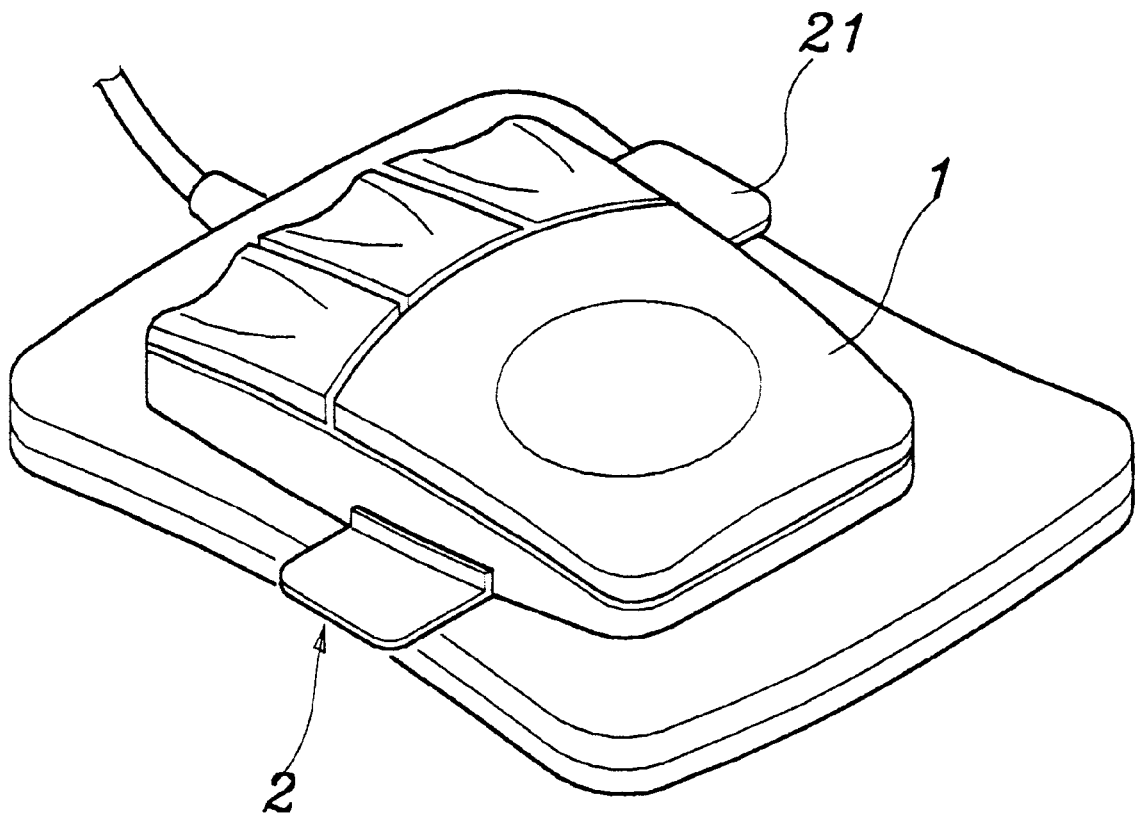
FIG. 2 is a perspective view of the present invention.
Figure 3:
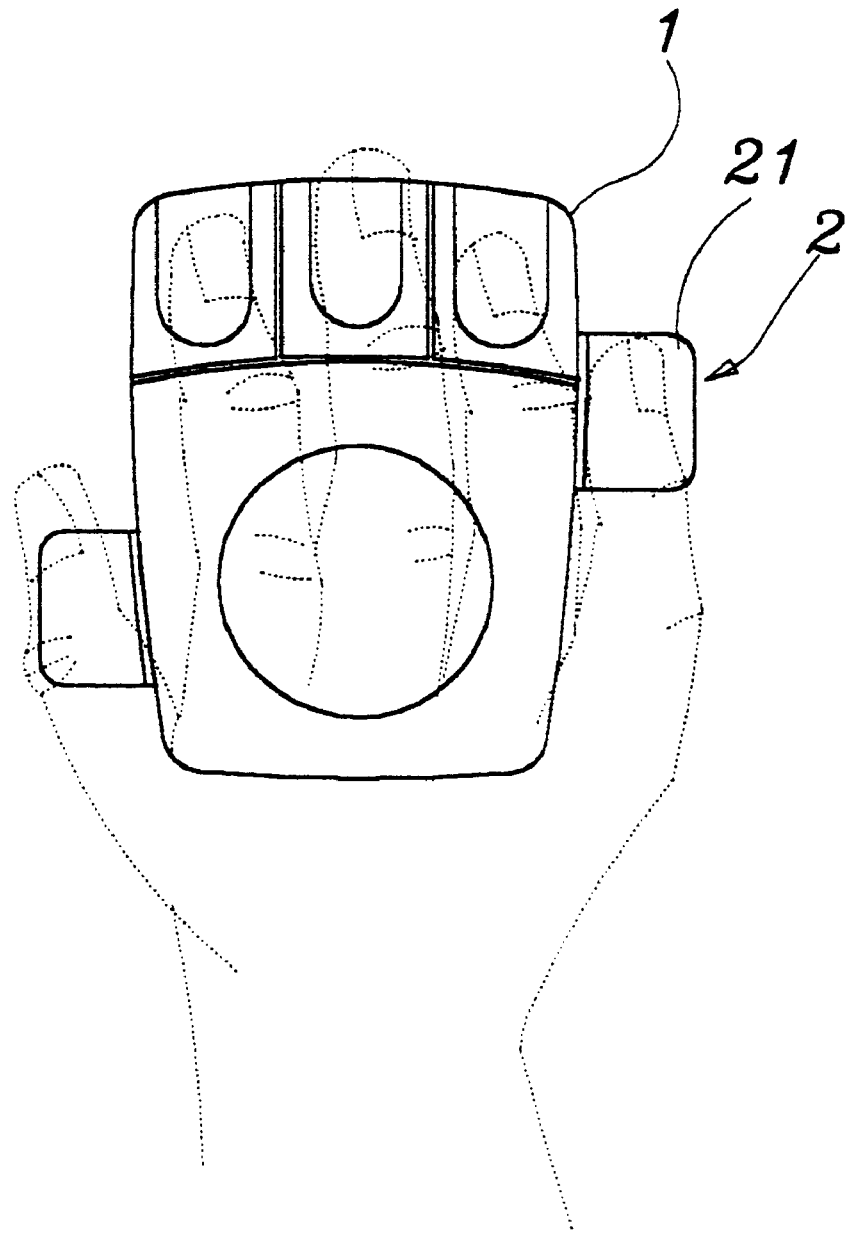
FIG. 3 shows that when operated, the thumb and little finger of the user are rested on the rest plates of the present invention.

Please refer to FIGS. 2 and 3. The present invention includes a housing 1 and a finger rest unit 2.

The housing 1 has a profile substantially suitable for manual operation of a user. The housing 1 is disposed with keys for moving the cursor and inputting commands.

Figure 4:
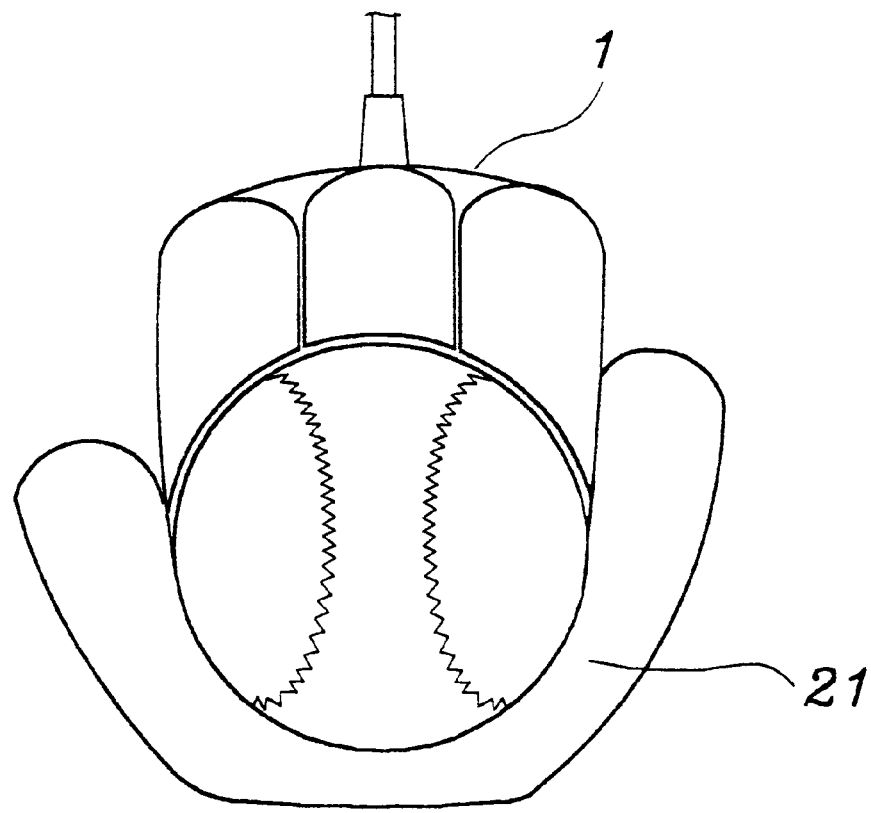
FIG. 4 shows another aspect of the rest plate which is integrally connected along a rear side and a part of lateral sides of the mouse.

The finger rest unit 2 includes more than one rest plates 21. Each rest plate 21 is L-shaped and transversely projects from a lateral side of the housing 1. In this embodiment, two rest plates 21 are respectively disposed on left and right sides of the housing 1 near front and rear ends as shown in FIG. 2. Accordingly, when a user holds the housing 1, the thumb and little finger of the user can rest on the rest plates 21. Alternatively, the rest plate 21 can be integrally connected along the rear side and a part of lateral side of the housing 1 as shown in FIG. 4 to provide a larger area for several fingers to rest thereon. For example, when applied to a two-key type mouse, the ring finger and little finger can together rest on the larger rest plate 21. Therefore, the rest plate 21 can bear most of the weight of the hand and the polished bottom face of the rest plate 21 can reduce the frictional force of the hand against the table face to facilitate the moving of the mouse.

Figure 5:
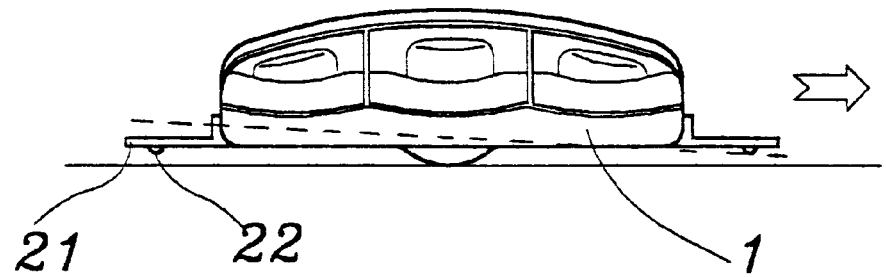
FIG. 5 shows that the rest plates enlarge the bottom area of the mouse to facilitate the control of the mouse.

Referring to FIG. 5, the finger rest unit 2 is disposed on two lateral sides of the housing 1 to increase the total bottom area of the mouse. Therefore, when moved, the inclination angle of the lateral side of the mouse is reduced so that the mouse can be closely attached to the table face to facilitate the moving of the mouse. In addition, the bottom face of the finger rest unit 2 can be disposed with protuberances 22 to smoothen the contacting and sliding of the mouse. When folded, the protuberance 22 projects from the lateral side of the housing and serves to massage the finger.

Figure 6:
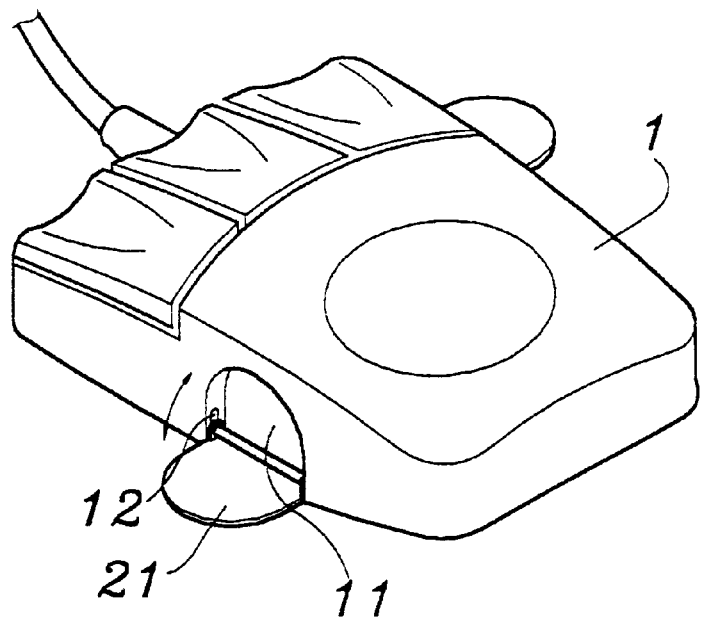
FIG. 6 shows that the rest plate is foldably disposed on the mouse.

Referring to FIG. 6, the rest plate 21 can be pivotally and foldably connected with the housing 1. The housing 1 is disposed with a receptacle 11 and a latch edge 12 for receiving and locating the rest plate 21. Therefore, the rest plate 21 can be selectively folded as necessary to facilitate the packing of the mouse.

Figure 7:
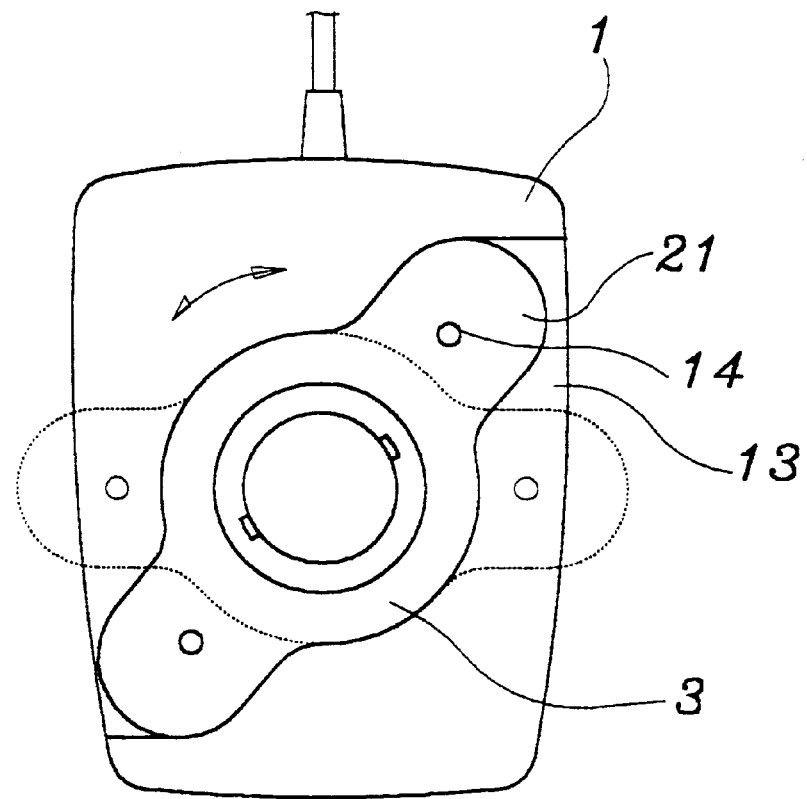
FIG. 7 shows that the rest plates are formed as a rotary plate which can be rotarily retracted.

FIG. 7 shows another aspect of the rest plate 21, in which the rest plate 21 is disposed at two ends of a rotary plate 3 which is rotatably disposed under the housing 1. The bottom face of the housing 1 is formed with a receptacle 13 and a latch edge 14 for receiving and locating the rotary plate 3. Accordingly, the rest plate 21 can be selectively extended or retracted.

Figure 8:
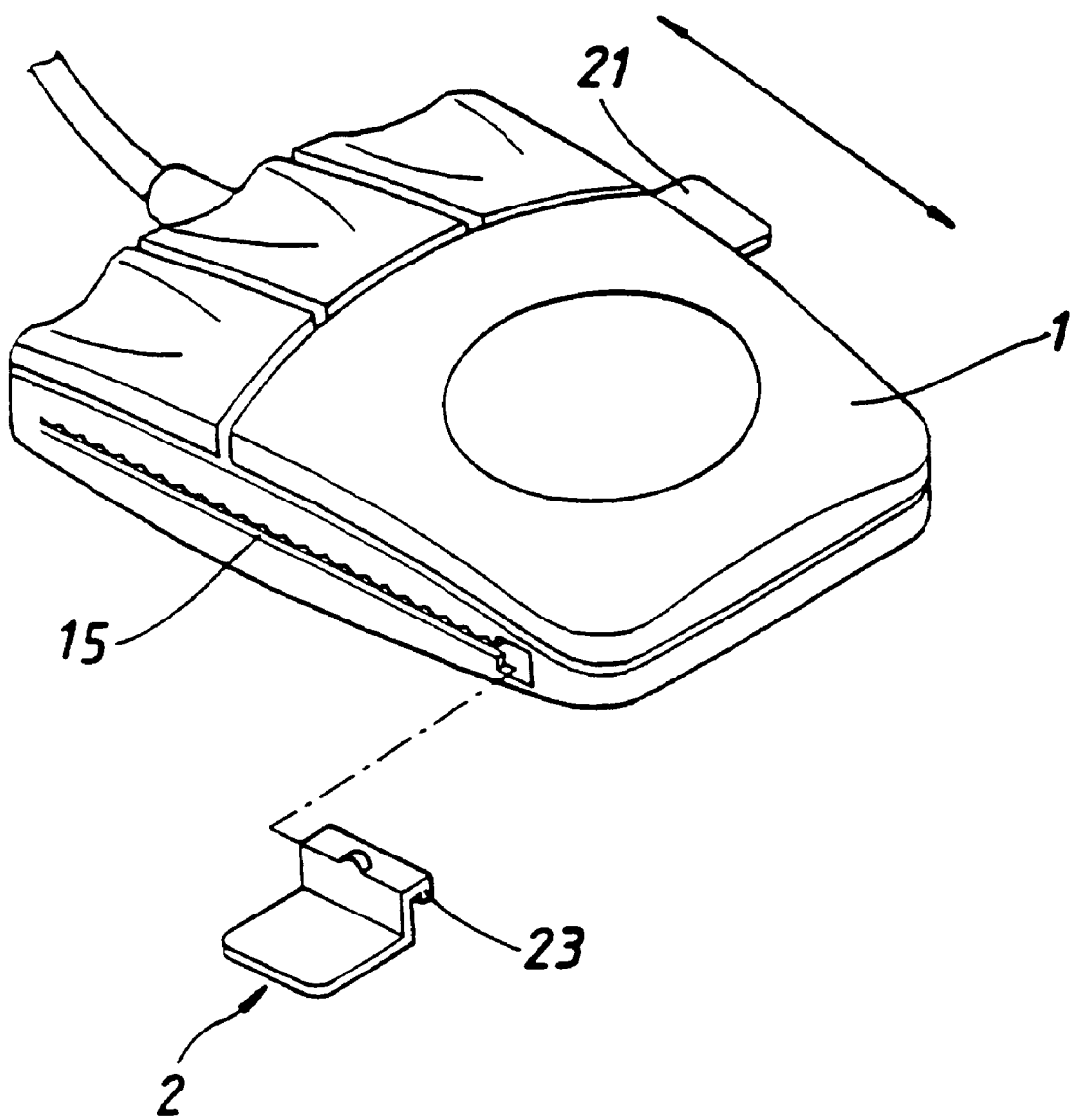
FIG. 8 shows that the rest plate is slidably disposed in a channel formed on lateral side of the mouse.

Referring to FIG. 8, alternatively, each lateral side of the housing 1 can be disposed with a channel 15 and the rest plate 21 has a corresponding hook section 23 at the end, whereby the rest plate 21 can be slidably fitted in the channel 15 and adjustably located at an optimal position for the user.

It should be noted that the above description and accompanying drawings are only used to illustrate some embodiments of the present invention, not intended to limit the scope thereof. Any modification of the embodiments should fall within the scope of the present invention.

What is claimed is:

1. A finger rest structure of a computer mouse, comprising:
   a housing having a profile substantially suitable for manual operation of a user, the housing being disposed with keys for moving a cursor and inputting commands and including a bottom area; and
   a finger rest unit comprising at least one rest plate transversely projecting from a lateral side of the housing for a finger to rest thereon, the rest plate enlarging the bottom area of the housing to facilitate moving of the mouse, the rest plate having such an area that fingers of a user can rest thereon, the rest plate being pivotally and foldably connected with the housing;
   wherein the housing is disposed with a receptacle and a latch edge for receiving and locating the rest plate.

2. A finger rest structure of a computer mouse, comprising:
   a housing having a profile substantially suitable for manual operation of a user, the housing being disposed with keys for moving a cursor and inputting commands and including a bottom area; and
   a finger rest unit comprising at least one rest plate transversely projecting from a lateral side of the housing for a finger to rest thereon, the rest plate enlarging the bottom area of the housing to facilitate moving of the mouse, the rest plate having such an area that fingers of a user can rest thereon, the rest plate being L-shaped, the rest plate being pivotally and foldably connected with the housing;
   wherein two rest plates are respectively disposed on left and right sides of the housing near front and rear ends and the housing is disposed with a receptacle and a latch edge for receiving and locating each rest plate.

3. A finger rest structure of a computer mouse, comprising:
   a housing having a profile substantially suitable for manual operation of a user, the housing being disposed with keys for moving a cursor and inputting commands and including a bottom area; and
   a finger rest unit comprising at least one rest plate transversely projecting from a lateral side of the housing for a finger to rest thereon, the rest plate enlarging the bottom area of the housing to facilitate moving of the mouse, the rest plate having such an area that fingers of a user can rest thereon;
   wherein the rest plate is disposed at two ends of a rotary plate which is rotatably disposed under the housing, the bottom face of the housing being formed with a receptacle and a latch edge for receiving and locating the rotary plate.

4. A finger rest structure of a computer mouse, comprising:
   a housing having a profile substantially suitable for manual operation of a user, the housing being disposed with keys for moving a cursor and inputting commands and including a bottom area; and
   a finger rest unit comprising at least one rest plate transversely projecting from a lateral side of the housing for a finger to rest thereon, the rest plate enlarging the bottom area of the housing to facilitate moving of the mouse, the rest plate having such an area that fingers of a user can rest thereon;
   wherein the rest plate is integrally connected along the rear side and a part of the lateral side of the housing and is disposed at two ends of a rotary plate which is rotatably disposed under the housing, a bottom face of the housing being formed with a receptacle and a latch edge for receiving and locating the rotary plate.

5. A finger rest structure as claimed in claim 1, wherein the bottom face of the finger rest unit is disposed with protuberances to smoothen the contacting and sliding of the mouse, whereby when folded, the protuberance projects from the lateral side of the housing and serves to massage the finger.

6. A finger rest structure of a computer mouse, comprising:
   a housing having a profile substantially suitable for manual operation of a user, the housing being disposed with keys for moving a cursor and inputting commands and including a bottom area; and
   a finger rest unit comprising at least one rest plate transversely projecting from a lateral side of the housing for a finger to rest thereon, the rest plate enlarging the bottom area of the housing to facilitate moving of the mouse, the rest plate having such an area that fingers of a user can rest thereon;
   wherein the lateral side of the housing is disposed with a channel to slidably fit a corresponding hook disposed at an end of the rest plate to an optimal position.

7. A finger rest structure of a computer mouse, comprising:
   a housing having a profile substantially suitable for manual operation of a user, the housing being disposed with keys for moving a cursor and inputting commands and including a bottom area; and
   a finger rest unit comprising at least one rest plate transversely projecting from a lateral side of the housing for a finger to rest thereon, the rest plate enlarging the bottom area of the housing to facilitate moving of the mouse, the rest plate having such an area that fingers of a user can rest thereon;
   wherein the rest plate is integrally connected along a rear side and a part of the lateral side of the housing and wherein the lateral side of the housing is disposed with a channel to slidably fit a corresponding hook disposed at an end of the rest plate to an optimal position.

* * * * *